United States Patent [19]

Gentilo et al.

[11] 4,347,427
[45] Aug. 31, 1982

[54] SUBMERGED ARC WELDING GUN

[75] Inventors: Dennis R. Gentilo, Jeannette; Donald A. Smith, Greensburg; David L. Pifer, Jeannette, all of Pa.

[73] Assignee: Elliott Turbomachinery Co., Inc., Jeannette, Pa.

[21] Appl. No.: 161,233

[22] Filed: Jun. 19, 1980

[51] Int. Cl.³ .............................................. B23K 9/18
[52] U.S. Cl. .............................. 219/137.8; 219/73.2; 219/137.31
[58] Field of Search ................... 219/126, 73, 73.2, 74, 219/137.31, 137.8

[56] References Cited

U.S. PATENT DOCUMENTS

| 3,025,387 | 3/1962 | Kinney. | |
|---|---|---|---|
| 3,539,756 | 11/1970 | Schwatzbart | 219/74 |
| 3,582,608 | 6/1971 | Ito | 219/126 |
| 3,826,888 | 7/1974 | Garfield | 219/74 |
| 4,153,832 | 5/1979 | Ito | 219/73.2 X |
| 4,221,957 | 9/1980 | Barger | 219/73 |

FOREIGN PATENT DOCUMENTS

| 318998 | 8/1934 | Italy | 219/137.31 |
|---|---|---|---|
| 394773 | 7/1933 | United Kingdom | 219/137.31 |

Primary Examiner—Elliot A. Goldberg
Attorney, Agent, or Firm—J. Raymond Curtin

[57] ABSTRACT

A submerged arc welding gun includes a housing having a bore extending therethrough. The housing includes a welding nozzle defining one end. Welding wire is directed through the bore of the housing to said nozzle. A flux tube is also disposed within the bore in spaced relation to the welding wire for delivering flux from a source thereof to the nozzle. The flux tube terminates substantially adjacent to the nozzle. The flux tube is connected to a source of pressure for feeding the flux through the tube to the nozzle.

3 Claims, 1 Drawing Figure

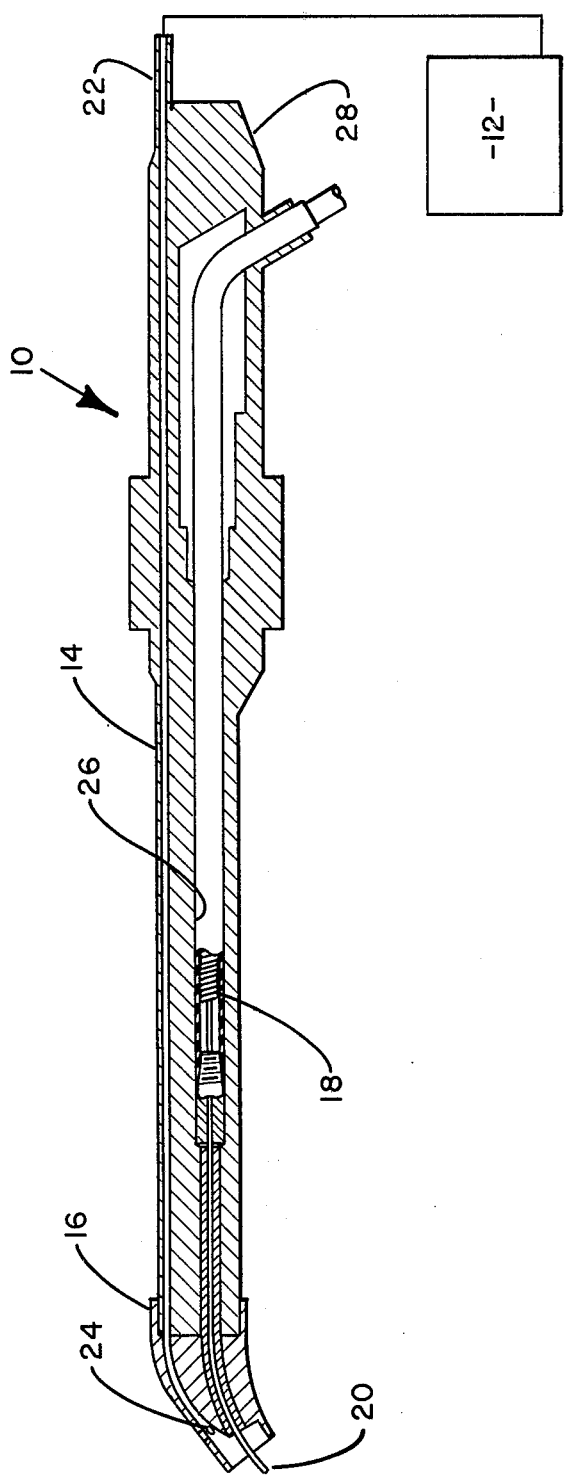

SUBMERGED ARC WELDING GUN

BACKGROUND OF THE INVENTION

This invention relates to a submerged arc welding gun, and in particular, to an improvement therein which permits use of the gun in a horizontal position during the welding process.

The use of the submerged arc welding process to weld metallic pieces in various industrial applications has become quite prevalent in recent years. Heretofore, one of the drawbacks to increased utilization of the submerged arc welding process, has been the need to maintain the welding gun in a generally vertical position during the welding process. The vertical prositioning of the gun during the welding process has been necessitated because the flux employed in the submerged arc welding process has been fed through the gun, at least partially by gravity.

Since gravity has been used to feed the flux through the welding gun, the gun could not be placed in a horizontal position during the welding process as this would prevent proper feeding of the flux.

Even though, in some instances, the flux has been partially fed through the gun under pressure, such pressurized feeding of the flux has not obviated the use of gravitational forces to feed the flux to the nozzle of the welding gun.

SUMMARY OF THE INVENTION

Accordingly, it is an object of this invention to improve submergable arc welding guns.

It is a further object of this invention to eliminate the use of gravitational forces to feed flux through the welding gun.

It is a further object of this invention to enable a submerged arc welding gun to be used in a horizontal position during the welding process.

These and other objects of the present invention are attained in a submerged arc welding gun including a housing having a bore extending therethrough and including a welding nozzle defining one end thereof. Guide means is disposed within the bore for directing a welding wire to the nozzle. A flux tube is also disposed within the bore in spaced relation to the guide means. The flux tube terminates substantially adjacent to the nozzle for delivering flux from a source thereof to the nozzle for submerging the weld wire within the flux. The flux tube is connected to a source of pressure for feeding the flux through the tube to the nozzle.

The present invention further includes a method of operating a submerged arc welding gun comprising the steps of feeding a welding wire to the nozzle of the welding gun and using a pressurized fluid to feed flux to the nozzle for discharge therefrom for covering the weld material deposited from the weld wire.

BRIEF DESCRIPTION OF THE DRAWING

The single FIGURE of the drawing is a longitudinal sectional view of a submerged arc welding gun including the present invention.

DESCRIPTION OF THE PREFERRED EMBODIMENT

Referring now to the drawing, there is disclosed a preferred embodiment of the present invention. In particular, reference numeral 10 refers to a submerged arc welding gun including the present invention. Welding gun 10 includes a generally elongated housing 14, which in the preferred embodiment, is generally cylindrical. A nozzle 16 is provided at one end of housing 14. Housing 14 further includes an axially extending bore 26.

Bore 26 has guide means 18 extending therethrough for delivering welding wire 20 from end 28 of the housing to nozzle 16. Guide means 18 is formed from a suitable dielectric material.

Housing 14 further has a tubular conduit 22 extending therethrough. Tubular conduit 22 is connected at one end to a source 12 of flux. The source of flux is maintained under pressure through the use of a pressurized fluid, as for example compressed air, for feeding the flux through conduit 22. The other end of the tubular conduit terminates substantially adjacent nozzle 16. Nozzle 16 further includes at least one vent hole 24 located downstream of conduit 22. The function of vent hole 24 shall be more fully explained hereinafter. As will be apparent from an inspection of the FIGURE the discharge end of the nozzle is of a width greater than the width of the vent hole. The relationship between these two openings is such that the fluid carrying the flux is vented so as not to blow the flux from the location of the weld.

As known in conventional submerged arc welding guns, the welding wire is automatically advanced through the gun by a conventional mechanism, not shown, and granular flux is fed from a source through a delivery conduit for free flow from the end of a nozzle to insure that the weld material deposited from the weld wire is submerged under a coating of the granular flux material.

As indicated previously, it has heretofore been necessary to maintain welding gun 10 in a vertical position during the welding process as gravity has been the main motivating force for delivering the flux from its source to the open end of nozzle 16. The foregoing requirement has limited utilization of submerged arc welding guns.

To eliminate the use of gravitational forces to permit submerged arc welding gun 10 to be employed in applications whereat the gun is maintained in a horizontal position during the welding process, the flux is delivered from pressurized source 12. The pressure within source 12 forces the flux through conduit 22 to nozzle 16 provided at the end of housing 14. From the nozzle, the flux freely flows through the open end of the nozzle to the material being welded. The pressurized source acts as the sole motivating force for delivering the flux through conduit 22. Vent holes 24 in nozzle 16 are provided as control means for maintaining the pressure within conduit 22 below a maximum predetermined magnitude. By employing the present invention the submerged arc welding gun may be used to weld inaccessible areas where the gun could not heretofore be utilized.

While a preferred embodiment of the present invention has been described and illustrated, the invention should not be limited thereto but may be otherwise embodied within the scope of the following claims.

We claim:

1. A submerged arc welding gun comprising:
    first passage means for directing a welding wire from an entrance end of the gun to a discharge end of the gun, second passage means for directing welding flux material from an entrance end of the gun to the discharge end of the gun, a source of fluid under pressure for propelling welding flux through the second passage means, a nozzle member having discharge opening encircling the discharge end of the gun so that welding flux and welding wire pass simultaneously from the gun, the nozzle having at least one opening formed therein for venting the fluid to accomplish substantial separation of the fluid from the flux with the width of said one opening being substantially less than the width of the discharge opening.

2. A submerged arc welding gun in accordance with claim 1 wherein said fluid source is compressed air.

3. A submerged arc welding gun as described in claim 1 wherein the nozzle member is provided with curvature such that the weld wire and welding flux encounter an abrupt change in direction just before discharge from the gun.

* * * * *